United States Patent [19]

Enochs

[11] Patent Number: 4,997,253
[45] Date of Patent: Mar. 5, 1991

[54] ELECTRO-OPTICAL TRANSDUCER MODULE AND A METHOD OF FABRICATING SUCH A MODULE

[75] Inventor: Raymond S. Enochs, Hillsboro, Oreg.

[73] Assignee: Tektronix, Inc., Beaverton, Oreg.

[21] Appl. No.: 332,270

[22] Filed: Apr. 3, 1989

[51] Int. Cl.⁵ .......................... G02B 6/36; H01J 5/16; B32B 31/00
[52] U.S. Cl. .............................. 350/96.20; 350/96.10; 250/227.11; 156/272.4
[58] Field of Search ............... 350/96.20, 96.21, 96.10; 250/227; 156/272.4, 273.7, 320

[56] References Cited

U.S. PATENT DOCUMENTS

| | | | |
|---|---|---|---|
| 4,237,474 | 12/1980 | Ladany | 357/81 |
| 4,431,261 | 2/1984 | Kozikowski | 350/96.20 |
| 4,500,165 | 2/1985 | Scholl et al. | 350/96.20 |
| 4,722,586 | 2/1988 | Dodson et al. | 350/96.20 |
| 4,741,796 | 5/1988 | Althaus et al. | 156/272.4 |

FOREIGN PATENT DOCUMENTS

| | | |
|---|---|---|
| 0061772 | 6/1982 | European. Pat. Off. . |
| 0111263 | 1/1983 | European Pat. Off. . |
| 2002140 | 2/1979 | United Kingdom . |
| 2093631 | 9/1982 | United Kingdom . |
| 2126795 | 9/1982 | United Kingdom . |
| 2124402 | 2/1984 | United Kingdom . |

*Primary Examiner*—Akm Ullah
*Attorney, Agent, or Firm*—John Smith-Hill; Peter J. Meza

[57] ABSTRACT

An electro-optical transducer module comprises a substrate having a planar main surface, an electro-optical transducer adhered directly to the main surface of the substrate, and an optical fiber adhered directly to the main surface of the substrate. The optical fiber has an end face in optically coupled relationship with the transducer. A handling element is adhered to the fiber, the fiber being between the handling element and the main surface of the substrate.

14 Claims, 1 Drawing Sheet

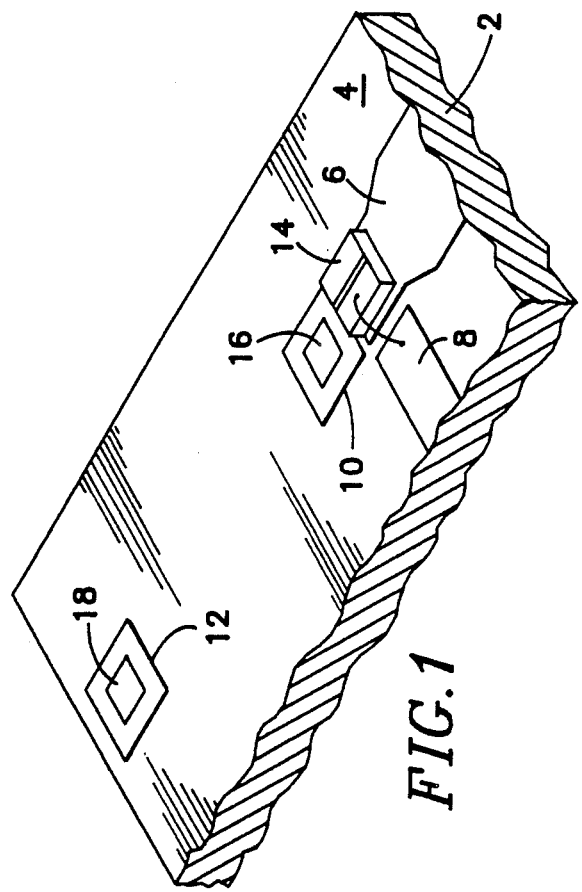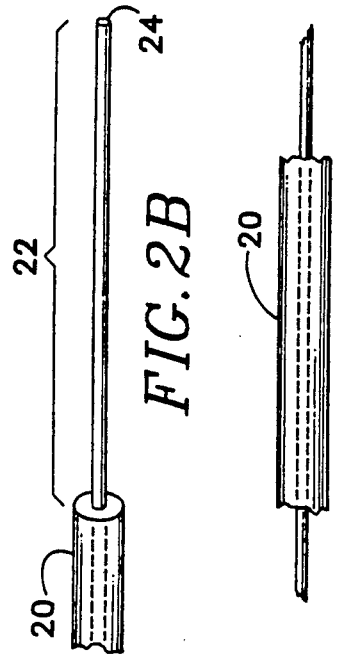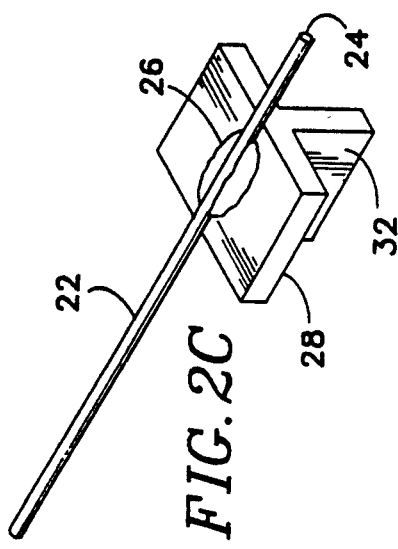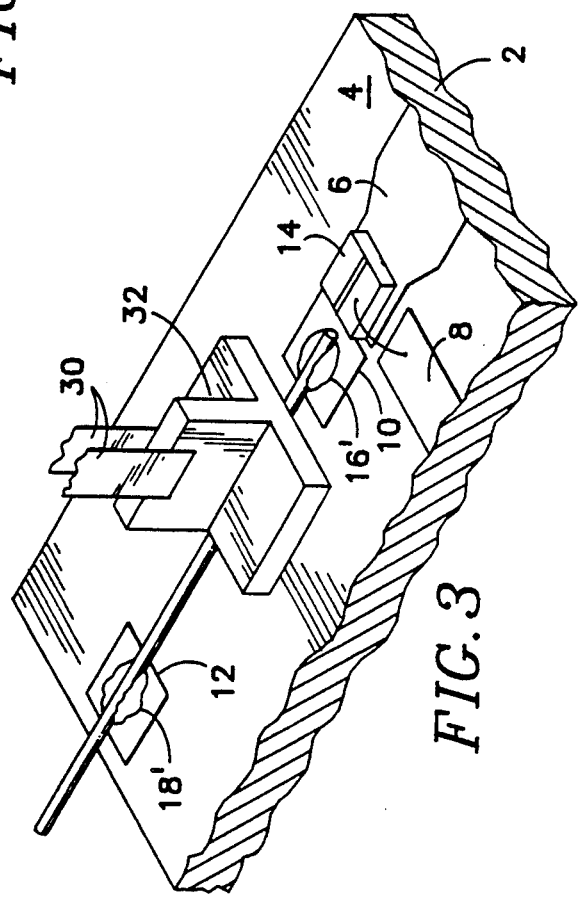

ELECTRO-OPTICAL TRANSDUCER MODULE AND A METHOD OF FABRICATING SUCH A MODULE

BACKGROUND OF THE INVENTION

This invention relates to an electro-optical transducer module and a method of fabricating such a module.

U.S. Pat. No. 4,722,586 issued Feb. 2, 1988 to Dodson et al discloses a method of fabricating an electro-optical transducer module in which a metal diode mount is brazed to a layer of metallization on a planar reference surface of a multilayer ceramic body, and a laser diode is secured to the top of the diode mount by soldering. An end region of a single mode optical fiber is stripped of its protective jacket, metallized, and soldered to the top face of a ceramic fiber mount. A drop of solder cream is placed on the reference surface of the multilayer ceramic body. The fiber mount, which serves the dual purpose of rigidizing the end region of the fiber and providing a handling element that can be gripped using a micromanipulator of conventional form, is placed with its bottom face in contact with the solder cream and is positioned so that the end face of the fiber is optically coupled to the light-emitting region of the diode. When the fiber mount is properly positioned, the solder cream is heated and is allowed to cool, whereupon it bonds the fiber mount to the ceramic body.

In order to achieve satisfactory optical coupling between a single mode fiber and a laser diode, a tolerance of only about 0.1 $\mu$m is permitted on positioning the end face of the fiber relative to the diode in all three linear degrees of freedom. A disadvantage of the electro-optical transducer module disclosed in U.S. Pat. No. 4,722,586 is that the fiber mount and the diode mount result in the end face of the optical fiber and the light-emitting region of the diode both being spaced at a substantial distance from the reference surface of the ceramic body, and therefore any difference in coefficient of thermal expansion between the fiber mount and the diode mount can result in significant change in the relative positioning of the end face of the fiber and the light-emitting region of the diode, and consequent degradation of coupling between the fiber and the diode, when the module is exposed to a change in temperature.

SUMMARY OF THE INVENTION

The problem associated with difference in coefficient of thermal expansion between the fiber mount and the diode mount could be avoided if both the fiber and the diode were adhered directly to the reference surface. However, there are substantial practical obstacles to providing a module in which the fiber is adhered directly to the reference surface. In particular, if the laser diode is placed close to one end of a ceramic substrate and the fiber extends over the substrate to its opposite end, so that the fiber is rigidized close to its end face by virtue of its being adhered to the substrate over a length equal to several fiber diameters, it is necessary to grip the fiber over a region close to its end face, e.g. using a micromanipulator, and then bring the gripped region of the fiber into contact with the substrate. However, a single mode fiber, when stripped of its protective jacket, is typically 125 $\mu$m in diameter and therefore the jaws of the micromanipulator must be positioned within a distance of less than 62.5 $\mu$m in the direction perpendicular to the length of the end segment of the fiber if the fiber is to be gripped reliably and interference between the jaws and the substrate is to be avoided. It is not acceptable to grip the fiber at a sufficient distance from the end face that the jaws of the micromanipulator will not interfere with the substrate, because the fiber is so slender and flexible that the control over the position of the end face of the fiber is inadequate. This problem is avoided in the case of the module described in Pat. No. 4,722,586 through use of the ceramic fiber mount: soldering of the fiber to the fiber mount can be performed readily because the tolerance on the position of the fiber on the fiber mount is quite large; and the fiber mount can be gripped at a location such that the jaws of the micromanipulator will not interfere with the ceramic body.

A preferred embodiment of the present invention in a first aspect is a method of fabricating an electro-optical transducer module by adhering an electro-optical transducer directly to a planar main surface of a support member and adhering a handling element to an optical fiber near an end face thereof. A manipulator mechanism is attached to the handling element, and the manipulator mechanism is used to move the handling structure so as to bring the optical fiber to a position in which its end face is in optically coupled relationship with the transducer. The method further comprises adhering the optical fiber directly to the main face of the support member.

A preferred embodiment of the invention in a second aspect is an electro-optical transducer module comprising a support member having a planar main surface, and an electro-optical transducer adhered directly to the main surface of the support member. An optical fiber is adhered directly to the main surface of the support member and has an end face in optically coupled relationship with the transducer.

A preferred embodiment of the invention in a third aspect is an electro-optical transducer module comprising a support member having a planar main surface, and an electro-optical transducer adhered directly to the main surface of the support member. The electro-optical transducer has a port through which light can enter or leave the transducer. An optical fiber is adhered directly to the main surface of the support member and has an end face in optically coupled relationship with the port of the transducer.

A preferred embodiment of the invention in a fourth aspect is an electro-optical transducer module comprising a support member having a planar main surface, an electro-optical transducer adhered directly to the main surface of the support member, and an optical fiber adhered directly to the main surface of the support member. The optical fiber has an end face in optically coupled relationship with the transducer. A handling element is adhered to the fiber, the fiber being between the handling element and the main surface of the support member.

BRIEF DESCRIPTION OF THE DRAWINGS

For a better understanding of the invention, and to show how the same may be carried into effect, reference will now be made, by way of example, to the accompanying drawings in which:

FIG. 1 is a partial perspective view of a laser diode package before mounting an optical fiber therein, FIGS. 2A, 2B and 2C illustrate several steps in preparation of an optical fiber for mounting in a laser diode package, FIGS. 2A and 2B being elevational views and FIG. 2C being a perspective view, and FIG. 3 is a partial perspective view of the laser diode package having the fiber mounted therein.

DETAILED DESCRIPTION

FIG. 1 illustrates a ceramic substrate 2 having a planar main surface 4. The main surface 4 is metallized in four areas 6-12. The thickness of the layer of metallization in each of the areas 6-12 is typically in the range from 10-12 $\mu$m. A semiconductor die 14 in which a laser diode, for example an InGaAsP laser diode, is fabricated is adhered to the ceramic substrate 2 in the metallized area 6 by use of solder. Thus, the die is adhered directly to the substrate, in that the only material between the die and the ceramic material of the substrate is material that is necessary to the adhesion. The thickness of the layer of solder beneath the die is typically about 10-13 $\mu$m, and therefore the maximum distance between the die 14 and the ceramic substrate 2 is about 25 $\mu$m. The die itself is about 100 $\mu$m high, and its light-emitting port is typically 3 $\mu$m below the top surface of the die. Thus, the light-emitting port is at a height of about 117 to 122 $\mu$m above the surface 4. By wire bonding, the die is connected to the metallized area 8. The metallized areas 6 and 8 can be connected to a current source for driving the laser diode to emit light. Solder preforms 16 and 18 are welded to the metallized areas 10 and 12.

FIG. 2A shows the fiber with a protective jacket 20 of synthetic polymer material. The fiber may also have a buffer layer of organic material bonded thereto. FIG. 2B shows the fiber with the jacket 20 and the buffer layer, if any, stripped from an end segment 22 of the fiber. The end face 24 of the fiber is lensed or cleaved. A solderable metallization, not specifically shown, has been applied to the exposed end segment 22 of the fiber. Numerous metallurgical systems are known in the art for metallization of optical fiber. Metallization of the end face of the fiber is prevented by masking the end face after it is lensed or cleaved. Alternatively, metallization may be applied to the end face and a fresh end face formed by the lensing or cleaving operation. As shown in FIG. 2C, the metallized end segment 22 of the fiber is attached by solder 26 to a T-shaped metal handling element 28. The end segment of the fiber is soldered to the handling element over a distance of about ten fiber diameters, and therefore the fiber is rigidized in the vicinity of the handling element.

As shown in FIG. 3, the handling element 28 is gripped in the jaws 30 of a micromanipulator (not otherwise shown) by the stem 32 of its T-shaped section. The micromanipulator is used to position the handling element over the upper main surface 4 of the ceramic substrate, with the fiber having its end face positioned to receive light emitted by the laser diode. The diode is energized, and the level of optical power emitted from the fiber at its opposite end is monitored. The micromanipulator is used to adjust the position of the end face of the fiber in order to achieve a satisfactory degree of optical coupling between the diode and the end face of the fiber, as shown by the level of optical power emitted from the fiber. The end face 24 of the fiber is about ten fiber diameters from the handling element 28, so that the region of the fiber between the end face and the handling element is not subject to significant bending due to the weight of the fiber, and does not move significantly relative to the handling element when the handling element is accelerated and decelerated by the micromanipulator. When the fiber is satisfactorily positioned, heat is applied to the solder preform 16 on the metallized area 10, and the solder melts and wets the metallization on the fiber and the substrate, thus forming a solder deposit 16' which bonds the fiber to the ceramic substrate. The fiber is adhered directly to the substrate, but the handling element is adhered to the substrate only through the fiber and therefore is not adhered directly to the substrate. The thickness of the layer of solder beneath the fiber over the area 10 is typically in the range from 25 to 50 $\mu$m so that the central axis of the fiber is at a height above the surface 4 in the range from about 97 $\mu$m to about 123 $\mu$m. This range of possible heights for the central axis of the fiber accommodates a wide variation in heights of the die.

Concurrently with heating the solder preform on the metallized area 10, the solder preform 18 on the metallized area 12 is heated and forms a deposit 18' which bonds the fiber to the substrate. The thickness of the layer of solder beneath the fiber over the area 12 is not critical, because the bond provided by the solder deposit 18' is only a stress relief bond, to protect the bond formed by the deposit 16' from damage due to stress applied to the fiber.

The T-shaped configuration of the handling element permits components to be placed on the substrate fairly close to the handling element without there being any risk that the jaws 30 of the micromanipulator will engage or interfere in any other fashion with those components.

By adhering the fiber and the die directly to the substrate, the space between the die and the substrate and between the fiber and the substrate is minimized, and therefore difference between the coefficient of thermal expansion of the material between the light-emitting region of the die and the substrate and that of the material between the central axis of the fiber and the substrate does not cause substantial variation with temperature of the relative positions of the end face of the fiber and the light-emitting region of the die.

By adhering the die directly to the ceramic substrate, it is possible to bring a controlled impedance line much closer to the die than is the case when the die is placed on a diode mount. This enables a greater degree of control to be exerted over the output power level of the diode.

The solders that are used in adhering the various components of the package together depend on the metallizations that are applied to the surface 4 and the end segment of the fiber. If, for example, the metallization has gold top-metal, an indium-lead or gold-tin solder may be employed. If an 80 wt % Au—20 wt % Sn solder, which has a melting point of 280° C., is used for the die-to substrate and fiber-to-substrate joints, a wide variety of lower-melting-point solders are available for subsequent assembly operations. Typical assembly operations would include bonding a lid to the substrate and sealing the fiber into an exit tube of the package.

Polarization retaining fiber is not circularly symmetrical about the central axis of the fiber. For example, the core of the fiber might be elliptical in cross-section, or the fiber might include longitudinal reinforcing ribs. Such a fiber can be adhered to the handling element in a predetermined orientation about its central axis, and the handling element can be positioned relative to the substrate at a predetermined angular position about the central axis of the end segment of the fiber, and this ensures that the state of polarization of light emitted by the laser diode is preserved as the light is propagated along the fiber.

It will be appreciated that the invention is not restricted to the particular embodiment that has been described, and that variations may be made therein without departing from the scope of the invention as defined in the appended claims and equivalents thereof. For example, although the invention has been described with reference to a single mode, light emitting module, the invention is also applicable to multimode emitting modules and to receiving modules. In these other modules, positioning of the optical fiber relative to the emitting or receiving diode is not so critical as in the case of a single mode emitting module. Further, in applications where true hermeticity is not critical and outgassing can be tolerated, organic adhesives may be used instead of solders.

I claim:

1. An electro-optical transducer module comprising:
   a substrate having a planar main surface,
   an electro-optical transducer adhered directly to the main surface of the substrate,
   an optical fiber adhered directly to the main surface of the substrate, the optical fiber having an end face in optically coupled relationship with the transducer, and
   a handling element adhered to the fiber, the fiber being between the handling element and the main surface of the substrate.

2. A transducer module according to claim 1, wherein the electro-optical transducer is at a distance in the range from about 20 $\mu$m to about 25 $\mu$m from the main surface of the substrate.

3. A transducer module according to claim 1, wherein the optical fiber is at a distance in the range from about 35 $\mu$m to about 62 $\mu$m from the main surface of the substrate.

4. A transducer module according to claim 1, wherein the transducer is metallurgically bonded to the main surface of the substrate.

5. A transducer module according to claim 1, wherein the optical fiber is metallurgically bonded to the main surface of the substrate.

6. A transducer module according to claim 1, wherein the handling element is metallurgically bonded to the fiber.

7. An electro-optical transducer module comprising:
   a substrate having a planar main surface,
   an electro-optical transducer adhered directly to the main surface of the substrate, the electro-optical transducer having a port through which light can enter or leave the transducer, and
   an optical fiber adhered directly to the main surface of the substrate, the optical fiber having an end face in optically coupled relationship with the port of the transducer wherein the diameter of the fiber is about 125 $\mu$m, the transducer is a die of semiconductor material having upper and lower main faces spaced by a distance of about 100 $\mu$m and the port is at a distance of about 3 $\mu$m from the upper main face of the die, and the die is at a distance in the range from about 20 $\mu$m to about 25 $\mu$m from the main surface of the substrate.

8. A transducer module according to claim 7, wherein the optical fiber is at a distance in the range from about 35 $\mu$m to about 62 $\mu$m from the main surface of the substrate.

9. A transducer module according to claim 7, wherein the transducer is metallurgically bonded to the main surface of the substrate.

10. A transducer module according to claim 7, wherein the optical fiber is metallurgically bonded to the main surface of the substrate.

11. A method of fabricating an electro-optical transducer module, comprising:
    (a) adhering an electro-optical transducer directly to a planar main surface of a substrate and adhering a handling element to an optical fiber near an end face thereof,
    (b) attaching a manipulator mechanism to the handling element, and using the manipulator mechanism to move the handling element so as to bring the optical fiber to a position in which its end face is in optically coupled relationship with the transducer, and
    (c) adhering the optical fiber directly to the main face of the substrate.

12. A method according to claim 11, wherein the substrate is made of ceramic material and the step of adhering the electro-optical transducer to the main surface of the substrate comprises metallizing a selected area of the main surface of the substrate and soldering the transducer to the metallized area.

13. A method according to claim 11, wherein a selected area of the main surface of the substrate is metallized, the optical fiber is metallized, and adhering the optical fiber directly to the main face of the substrate comprises soldering the optical fiber to the metallized area of the main surface of the substrate.

14. A method according to claim 11, wherein the fiber is metallized and the step of adhering the handling element to the optical fiber comprises soldering the handling element to the optical fiber.

* * * * *